United States Patent [19]

Omagari et al.

[11] Patent Number: 4,629,206
[45] Date of Patent: Dec. 16, 1986

[54] REVERSE DEVICE FOR A VEHICLE

[75] Inventors: Masaharu Omagari; Tsuneo Kazikawa, both of Saitama; Takahumi Suzuki, Tokyo, all of Japan

[73] Assignee: Honda Giken Kogyo Kabushiki Kaisha, Tokyo, Japan

[21] Appl. No.: 715,635

[22] Filed: Mar. 22, 1985

[30] Foreign Application Priority Data

Mar. 22, 1984 [JP] Japan ................... 59-53619

[51] Int. Cl.$^4$ .............................................. B60K 29/02
[52] U.S. Cl. .................................................. 180/336
[58] Field of Search ................ 180/336, 333, 334, 335

[56] References Cited

U.S. PATENT DOCUMENTS 3,710,904  1/1973  Boyer ................................. 180/336
3,917,021  11/1975  Williams ............................ 180/336
4,031,977  6/1977  Grosseau ........................... 180/336

FOREIGN PATENT DOCUMENTS 57-157592  10/1982  Japan .

Primary Examiner—Richard A. Bertsch
Attorney, Agent, or Firm—Lyon & Lyon

[57] ABSTRACT

A reverse lock-out control employing a bracket fixed to the handle bar of a vehicle and associated with a brake lever pivotly mounted to that bracket. The device includes a control lever pivotly mounted to the bracket adjacent the brake lever. A pin is slidably associated with the brake lever and a hole is provided in the control lever such that the brake lever and control lever may be engaged by the pin when the brake lever is in the off position. The control lever is linked to a reverse gear lock-out such that with the pin engaged, application of the brake will result in actuation of the lock-out mechanism.

2 Claims, 4 Drawing Figures

REVERSE DEVICE FOR A VEHICLE

BACKGROUND OF THE INVENTION

The field of the present invention is control mechanisms for vehicles.

Mechanisms have been known for providing a lock-out for a reverse gear. Such devices reduce the possibility that the operator of a vehicle can select reverse gear inadvertently. One such prior device is illustrated in Japanese Publication No. 57-157592. The device disclosed therein and other such lock-out devices typically employ a separate mechanism which must be actuated separately to allow access to the reverse gear.

SUMMARY OF THE INVENTION

The present invention is directed to a reverse lock-out control enabling the operator to select reverse gear by pressing a button adjacent the brake lever and employing the brake lever to disengage the lock-out mechanism. This allows braking and selecting of reverse gearing at the same time. Furthermore, the same control lever is used to add further to the convenience of operation.

To accomplish the foregoing a pin interengages the brake lever of the vehicle with a control lever. The control lever is linked to a lock-out mechanism in the transmission. When the pin engages both the control lever and the brake lever, braking action will disengage the lock-out mechanism such that reverse gear may be selected. Once selected, actuation of the brake lever is no longer required.

Accordingly, it is an object of the present invention to provide and improved reverse lock-out control for vehicles. Other and further objects and advantages will appear hereinafter.

DETAIL DESCRIPTION OF THE PREFERRED EMBODIMENT

Figure 1:
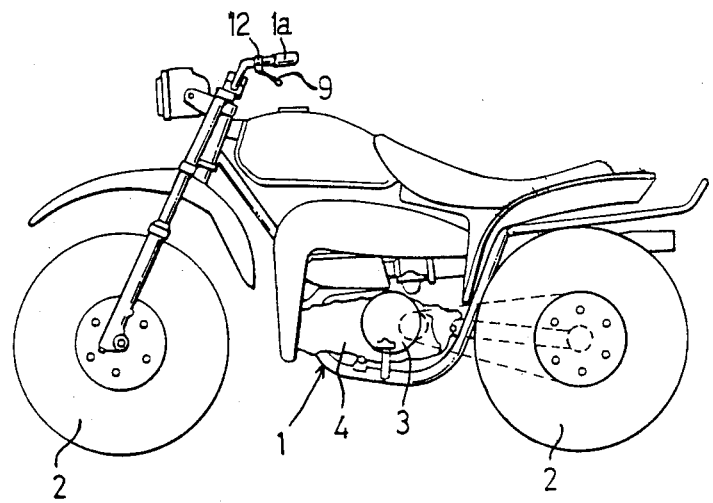
FIG. 1 is a side view of a vehicle upon which a reverse lock-out mechanism and control may be employed.

Turning in detail to the drawings, FIG. 1 illustrates a vehicle on which the present invention may be employed. The vehicle includes a frame 1, front and rear wheels 2, an engine 3 and a transmission 4. The vehicle illustrated is of a three-wheel design having two rear wheels.

Figure 2:
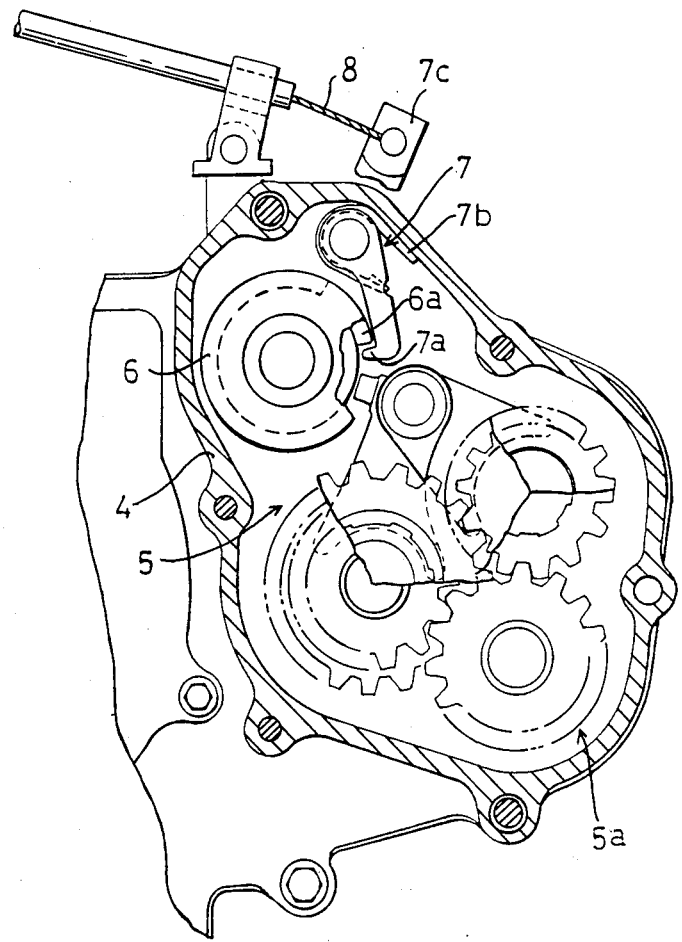
FIG. 2 is a cross sectional side view of a transmission which may be associated with the vehicle of FIG. 1.

Looking to FIG. 2, the transmission 4 is shown to include a transmission mechanism, generally designated 5, having a plurality of gears and shafts including a reverse idle gear 5a. Also included within the transmission mechanism 5 is a shift drum 6. The shift drum 6 has a raised element or stop 6a. Associated with the shift drum 6 is a reverse lock-out member 7 pivotly mounted to the transmission case. Located at the distal end of the reverse lock-out member 7 is a claw 7a. The claw 7a is arranged on the lock-out member 7 such that it will interfere with the rotation of the shift drum into the reverse position by engaging the stop 6a. A spring 7b biases the lock-out member 7 toward the shift drum such that the claw 7a will normally interfere with the travel of the shift drum 6 into the reverse gear position.

To unlock the reverse gear, lever 7c is coupled with the reverse lock-out member 7 to urge the member away from the shift drum 6 against the bias of the spring 7b. A cable 8 provides linkage for actuation of the lever 7c and in turn the reverse lock-out member.

Figure 3:
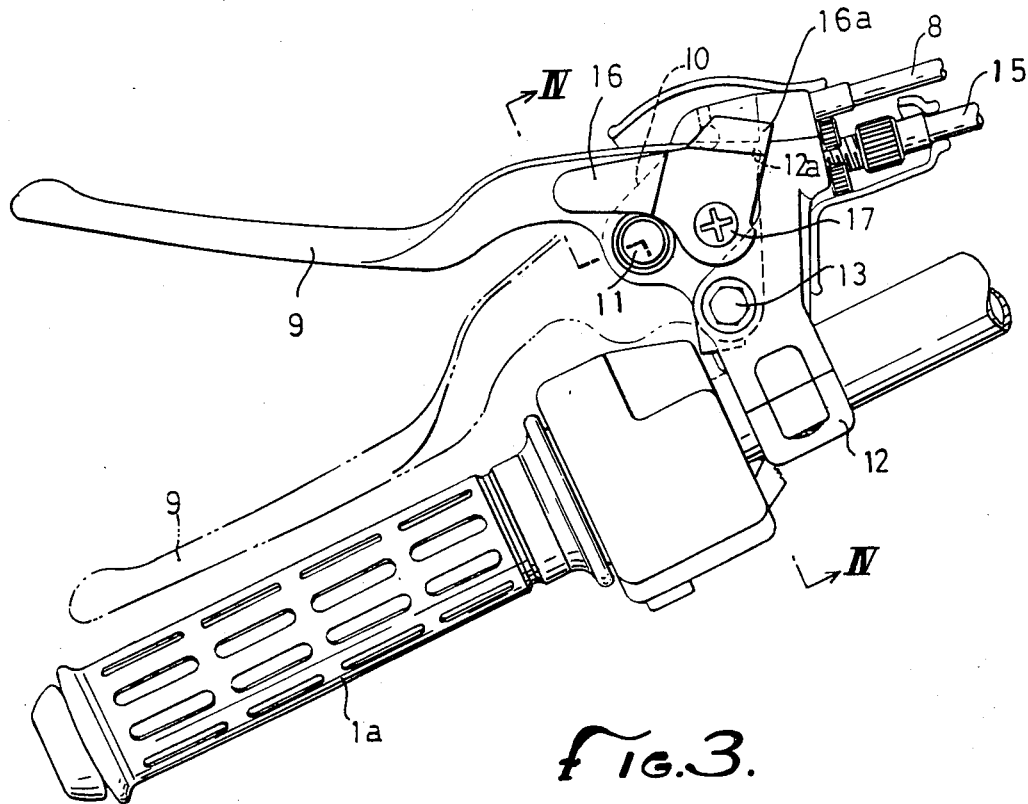
FIG. 3 is a detail plan view of the control mechanism of the vehicle of FIG. 1.
Figure 4:
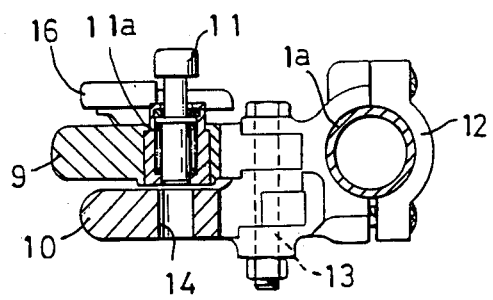
FIG. 4 is a cross sectional view taking a long line 4—4 of FIG. 3.

Looking next to FIGS. 3 and 4, a handle bar 1a is shown to provide support for a plurality of vehicle control elements. Of these elements, a brake lever 9 and a control lever 10 are pivotly mounted to a bracket 12 by means of a shaft 13. The bracket 12 is locked to the handle bar 1a. Slidably disposed in the brake lever 9 is a pin 11 the pin 11 is bias by a spring 11a to extend away from the control lever 10. A hole 14 is located in the control lever 10 which is sized to receive the pin 11. The hole 14 is in alignment with the pin 11 when the brake lever 9 is in its off position as shown in full line in FIG. 3. The brake lever 9 is coupled conventionally to the braking mechanism by means of linkage 15.

The control lever 10 is coupled to linkage 8 such that the lever 7c is pulled when the brake lever 9 is actuated with the pin 11 extending into the hole 14. As the brake lever 9 is actuated under these conditions, the lock-out member 7 is rotated to withdraw the claw 7a from interference with the stop 6a. The shift drum may then be rotated to the reverse position. Thus, prior to braking or at any time when the brakes are not applied, the reverse gear lock-out control may be engaged by pressing on the pin 11. Once the shift drum 6 has been positioned in the reverse position, the brake may be released or further applied. Once released, the pin 11 will pop from engagement with the control lever 10.

Also shown in association with the brake and lock-out control mechanisms is a parking lock mechanism. The parking lock mechanism includes a parking lever 16 pivotly mounted to the brake lever 9 about a fastener 17. A concavity 12a in the bracket 12 may cooperate with a pawl 16a on the parking lever 16 to engage the parking mechanism. To do so, the brake lever 9 is fully applied such that the parking lever 16 may be rotated to engage the pawl 16a with the bracket 12. The brakes then will remain on until the parking level 16 is returned to its original position. The throw of the lock-out number 7 may be such that the brake lever 9 cannot be applied to the extent necessary to engage the parking lever 16. Thus, while the pin 11 is engaged between the parking lever 9 and the control lever 10, the parking lock could not be actuated.

Thus, an improved reverse lock-out control for a vehicle is disclosed. While embodiments and applications of this invention have been shown and described, it would be apparent to those skilled in the art that many modifications are possible without departing from the inventive concepts herein. The invention, therefore, is not to be restricted except in the spirit of the appended claims.

What is claimed is:

1. A lock-out control for a vehicle, comprising
 a bracket fixed to the vehicle and having a mounting shaft;
 a brake lever pivotly mounted to said bracket about said shaft;
 a control lever pivotly mounted to said bracket about said shaft adjacent to said brake lever;

a pin slidably disposed in one of said brake lever and said control lever and a hole in the other of said brake lever and said control lever, said pin and said hole being aligned for engagement therebetween when said brake lever is in the off position;

a reverse gear lock-out; and linkage between said control lever and said reverse gear lock-out.

2. The reverse lock-out control of claim 1 wherein said pin is slidably disposed in said brake lever and said hole is in said control lever.

* * * * *